United States Patent
Gomez Diaz et al.

(10) Patent No.: US 11,341,620 B2
(45) Date of Patent: May 24, 2022

(54) BACKGROUND CORRECTION FOR BIREFRINGENCE MEASUREMENTS

(71) Applicant: Microsoft Technology Licensing, LLC, Redmond, WA (US)

(72) Inventors: Ariel Gomez Diaz, Cambridge (GB); David Lara Saucedo, London (GB); Peter Gyula Scholtz, Cambridge (GB); Patrick Neil Anderson, Cambridge (GB); Rokas Drevinskas, Cambridge (GB); Richard John Black, Cambridge (GB); James Hilton Clegg, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/867,323

(22) Filed: May 5, 2020

(65) Prior Publication Data
US 2021/0350510 A1   Nov. 11, 2021

(51) Int. Cl.
*G06T 5/00* (2006.01)
*G06T 5/20* (2006.01)

(52) U.S. Cl.
CPC ............... *G06T 5/008* (2013.01); *G06T 5/20* (2013.01); *G06T 2200/04* (2013.01); *G06T 2207/20212* (2013.01)

(58) Field of Classification Search
CPC ....... G06T 5/008; G06T 5/20; G06T 2200/04; G06T 2207/20212
USPC ........................................................ 382/154
See application file for complete search history.

(56) References Cited

U.S. PATENT DOCUMENTS

| | | | |
|---|---|---|---|
| 3,902,805 A | 9/1975 | Redner | |
| 5,504,581 A | 4/1996 | Nagata et al. | |
| 5,757,978 A | 5/1998 | Flick et al. | |
| 5,828,500 A | 10/1998 | Kida et al. | |
| 8,542,356 B2 | 9/2013 | Fiolka et al. | |

(Continued)

OTHER PUBLICATIONS

Bouchal, et al., "Geometric-Phase Microscopy for Quantitative Phase Imaging of Isotropic, Birefringent and Space-Variant Polarization Samples", In Journal of Scientific Reports, vol. 9, Mar. 5, 2019, 11 Pages.

(Continued)

*Primary Examiner* — Amandeep Saini
(74) *Attorney, Agent, or Firm* — Alleman Hall Creasman & Tuttle LLP

(57) ABSTRACT

One example provides a computer-implemented method for reading data stored as birefringence values in a storage medium. The method comprises acquiring an image of a voxel of the storage medium, applying a first low-pass filter with a first cutoff frequency to the image of the voxel to obtain a first background image, applying a second low-pass filter with a second cutoff frequency to the image of the voxel to obtain a second background image, the second cutoff frequency being different than the first cutoff frequency, determining an enhanced background image from the first background image and the second background image, determining birefringence values for the enhanced background image, determining birefringence values for the image of the voxel, and correcting the birefringence values for the image of the voxel based upon the birefringence values for the enhanced background image.

20 Claims, 13 Drawing Sheets

(56) References Cited

U.S. PATENT DOCUMENTS

| | | |
|---|---|---|
| 2004/0129867 A1 | 7/2004 | Mackey |
| 2007/0171427 A1 | 7/2007 | Shiode |
| 2008/0074644 A1 | 3/2008 | Levenson et al. |
| 2010/0135537 A1 | 6/2010 | Ye et al. |
| 2016/0091416 A1 | 3/2016 | Freudenthal et al. |
| 2019/0114307 A1* | 4/2019 | Stefanovici ............ H03M 13/37 |
| 2019/0373140 A1* | 12/2019 | Gudaitis ................ G09G 3/025 |
| 2021/0349010 A1 | 11/2021 | Gomez Diaz et al. |

OTHER PUBLICATIONS

Gu, et al., "Study of the Retardance of a Birefringent Waveplate at Tilt Incidence by Mueller Matrix Ellipsometer", In Journal of optics, vol. 20, No. 1, Dec. 12, 2017, 12 Pages.

Onuma, et al., "A Development of Two-dimensional Birefringence Distribution Measurement System with a Sampling Rate of 1.3 MHz", In Journal of Optics Communications, Mar. 15, 2014, pp. 69-73.

Shribak, Michael, "Polychromatic Polarization Microscope: Bringing Colors to a Colorless World", In Journal of Scientific Reports, vol. 5, Article No. 17340, Nov. 27, 2015, 10 Pages.

Shribak, et al., "Techniques for Fast and Sensitive Measurements of Two-dimensional Birefringence Distribution", In Journal of Applied Optics, vol. 42, Issue 16, Jun. 1, 2003, pp. 3009-3017.

Montarou, Carole C., "Low-Level Birefringence Measurement Methods Applied to the Characterization of Optical Fibers and Interconnects", A Thesis Submitted for the Partial Fulfillment of the Requirements for the Degree of Doctor of Philosophy, School of Electrical and Computing Engineering, Georgia Institute of Technology, Apr. 2005, 222 Pages.

Oldenbourg, Rudolf, "Polarization Microscopy with the LC-PolScope", In Journal of Live Cell Imaging: A Laboratory Manual, Nov. 2003, 42 Pages.

"International Search Report & Written Opinion issued in PCT Application No. PCT/US21/028274", dated Jul. 29, 2021, 12 Pages.

"International Search Report and Written Opinion Issued in PCT Application No. PCT/US21/024022", dated Jul. 12, 2021, 13 Pages.

"Ex Parte Quayle Action Issued in U.S. Appl. No. 16/867,359", dated Jan. 31, 2022, 9 Pages.

* cited by examiner

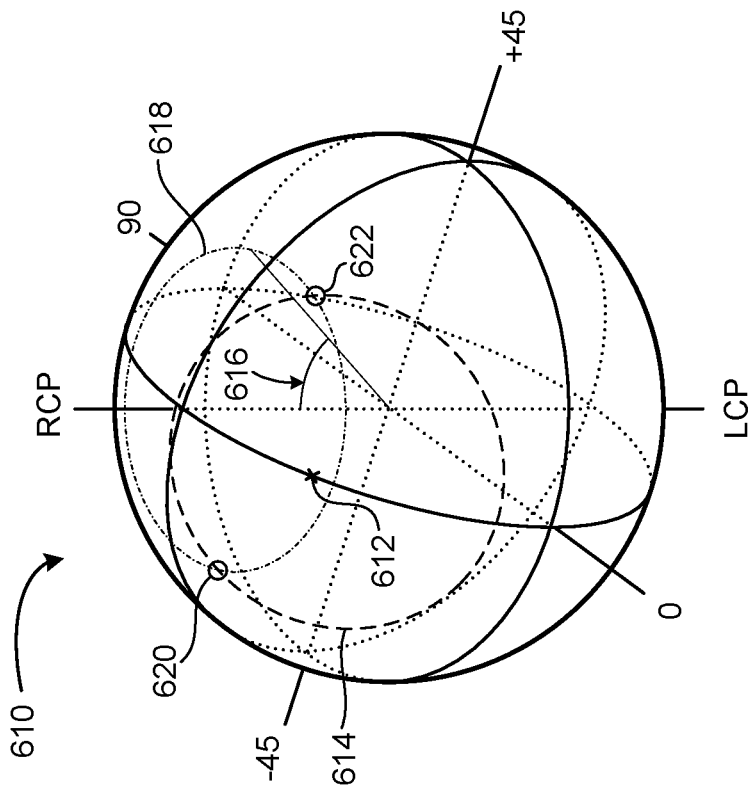
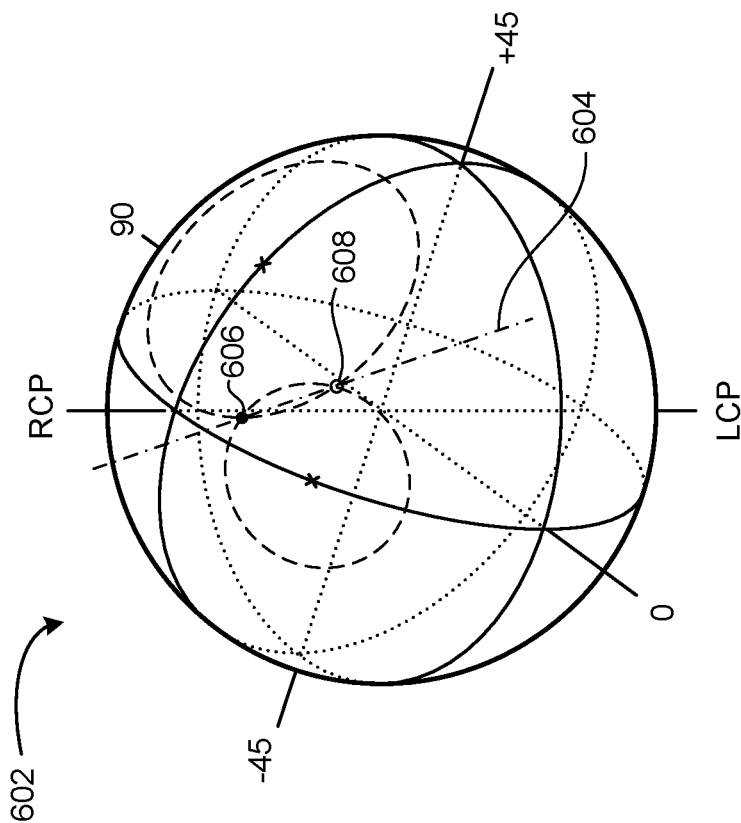
FIG. 6

BACKGROUND CORRECTION FOR BIREFRINGENCE MEASUREMENTS

BACKGROUND

Over the past decade, much of the world's data has moved into the cloud. To meet the increasing demand, cloud providers rely on a variety of data-storage technologies. These include non-volatile memory (NVM), flash, hard disk drives (HDDs), magnetic tape, and optical discs. These storage technologies differ from each other in terms of cost, latency, throughput, storage density, failure rate, and media lifetime.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A promising technology for storing data is to encode the data as localized birefringent voxels in a dielectric storage medium. Such data may be stored at high densities, and the storage medium may have a long lifetime compared to magnetic and other storage media. Reading a birefringent voxel involves probing the voxel with polarized light, and detecting polarization changes in the light resulting from the voxel. However, polarization changes also may arise from background sources, both external and internal to the storage medium. While external background effects can be corrected by acquiring a measurement in the absence of the storage medium, such background correction methods will not correct for background polarization changes arising from the storage medium itself. Further, acquiring a background measurement in the absence of the storage medium requires an additional measurement to be made, thereby increasing the amount of time utilized for data reading. Accordingly, aspects of the technology disclosed herein correct for background arising from sources external to the storage medium and the storage medium itself using a same image of the storage medium.

One aspect provides a computer-implemented method for reading data stored as birefringence values in a storage medium. The method comprises acquiring an image of a voxel of the storage medium, applying a first low-pass filter with a first cutoff frequency to the image of the voxel to obtain a first background image, applying a second low-pass filter with a second cutoff frequency to the image of the voxel to obtain a second background image, the second cutoff frequency being different than the first cutoff frequency, determining an enhanced background image from the first background image and the second background image, determining birefringence values for the enhanced background image, determining birefringence values for the image of the voxel, and correcting the birefringence values for the image of the voxel based upon the birefringence values for the enhanced background image. The first background image can represent more local background characteristics, such as birefringence noise arising from other voxels in the storage medium, while the second background image can represent more global background characteristics. The effect of the first bandpass filter is to remove high-frequency data representing more detailed features of a voxel that is in focus, thereby leaving less detailed features from other voxels that are out-of-focus during the read process. With this aspect, an image of a birefringent sample can be used to correct for background arising both from the storage medium itself as well as from external sources, without acquiring a separate background measurement in the absence of the storage medium.

BRIEF DESCRIPTION OF THE DRAWINGS

FIG. 6 shows example solutions for birefringence values based upon two measurements and based upon one measurement.

DETAILED DESCRIPTION

As mentioned above, one promising technology for cloud data storage involves the use of high-power, short-pulse laser irradiance to optically write data into a solid dielectric substrate, such as glass. The irradiance induces at its focus a localized birefringence that can be later read back using polarization imaging. The term 'voxel' is used herein to refer to any discrete volume of a substrate where an individual data value (i.e., symbol) may be stored. The data stored in a voxel may take various forms. In principle, any of the Muller-matrix coefficients of a substrate lattice can be manipulated to encode data. In examples using silica glass substrates, the lattice perturbation from focused, polarized irradiance takes the form of a non-native birefringence localized at the focus. Accordingly, each voxel of the substrate can be modeled as a very small waveplate having a retardance magnitude and an azimuth angle. These model parameters may be manipulated independently to write a desired symbol to a given voxel. Here, the polarization angle of the beam determines the azimuth angle of a voxel, while various other factors (pulse amplitude, duration, energy, number, and/or spacing between pulses) determine the retardance of the voxel.

By dividing the continuous space of achievable azimuth angles and/or retardance magnitudes into discrete intervals, multi-bit data values can be encoded into each voxel by writing the birefringence of that voxel to be within one of the discrete intervals. Further, in some examples, plural parallel layers of voxel structures may be written to the same substrate by focusing the laser irradiance to specified depths below the irradiated surface of the substrate. These features, individually or in combination, may allow a high volume of data to be written into a single medium. In some examples, the storage medium comprises a solid, plate-like configuration. In other examples, the storage medium comprises a thin layer formed on another substrate. In further examples, the storage medium may have any other suitable configuration, such as a prism or cylinder.

A birefringent voxel behaves anisotropically when light passes through it, as different light polarization states travel at different speeds through the sample. As light travels through or reflects from a birefringent voxel, its polarization state is altered in a specific way that depends on the azimuth angle and retardance of the sample. As such, information regarding the azimuth angle and retardance of a voxel can be obtained by measuring the polarization state of polarized light that has interacted with a birefringent voxel.

Figure 1:
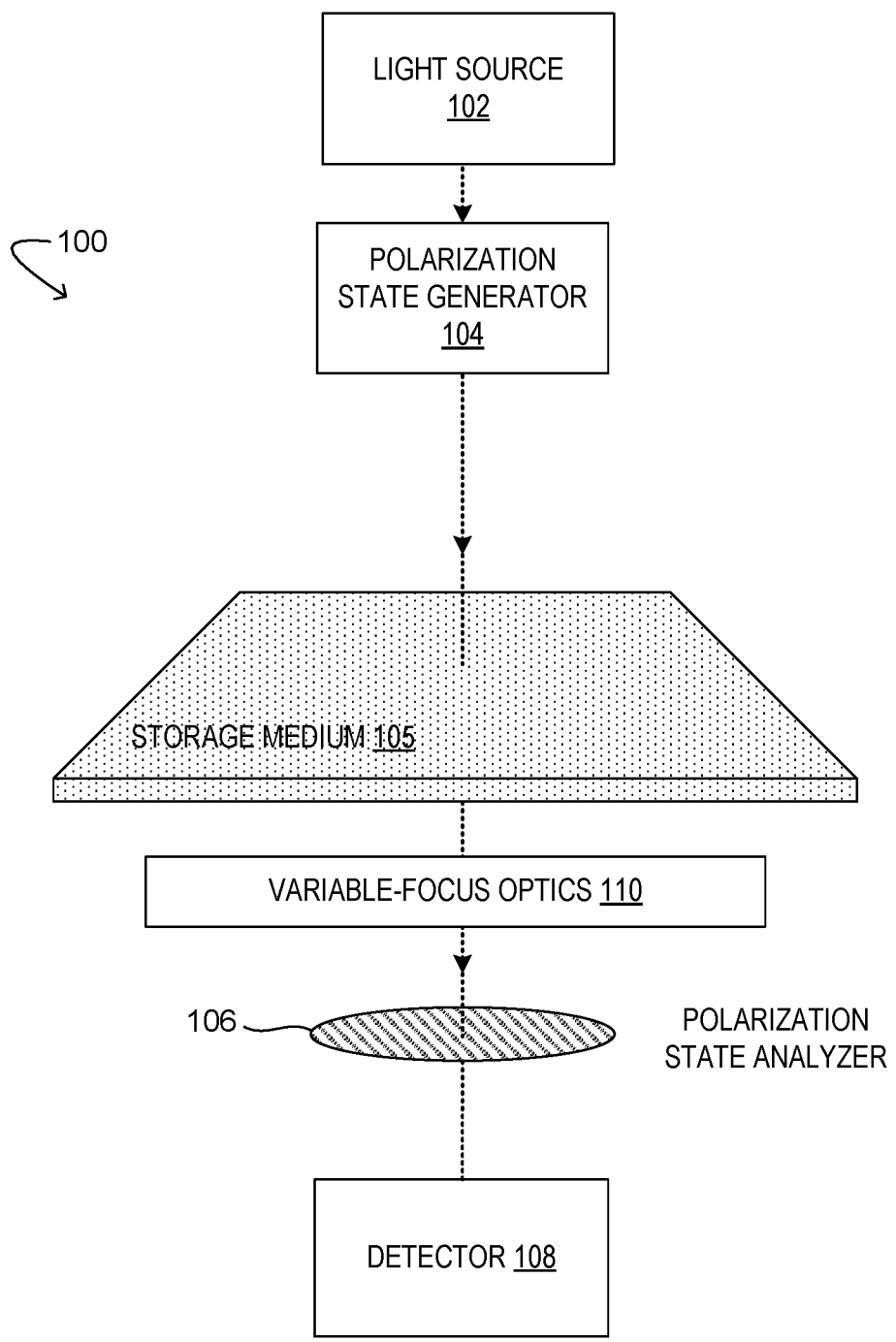
FIG. 1 schematically illustrates the reading of birefringent voxels in a storage medium.

Some methods of measuring a polarization state (and therefore the angle and retardance of a voxel) involve performing a series of measurements using different input or output (or both) polarizations. FIG. 1 schematically illustrates the reading of birefringent data stored in a storage medium 100. Light from a light source 102 passes through a polarization state generator (PSG) 104, which outputs polarized light with a polarization angle determined by the PSG. The light source may include an LED, laser or other light source.

After passing through the storage medium 100, the light from the light source 102 and PSG 104 passes through one or more voxels of a storage medium 105, through a polarization state analyzer (PSA) 106 and then to detector 108. The settings of PSA 106 and PSG 104 define a polarization state k for an intensity $m_k$ of a measurement, as described in more detail below. The detector 108 may include, for example, a CMOS image sensor (e.g. high-resolution/high frame-rate sensor) or other suitable photodetector array that can image an entirety of a focal plane positioned within the storage medium 105, and thereby image a plurality of arrayed voxels in a same image. In other examples, a point detector or small detector array, for example, a photodiode, phototransistor, or SPAD (single photon avalanche diode) may be used to build up an image point-by-point). Although FIG. 1 shows transmission of light rays through the storage medium and on to the image sensor, the light rays may, in other examples, reach the image sensor by reflection from the storage medium.

Figure 2:
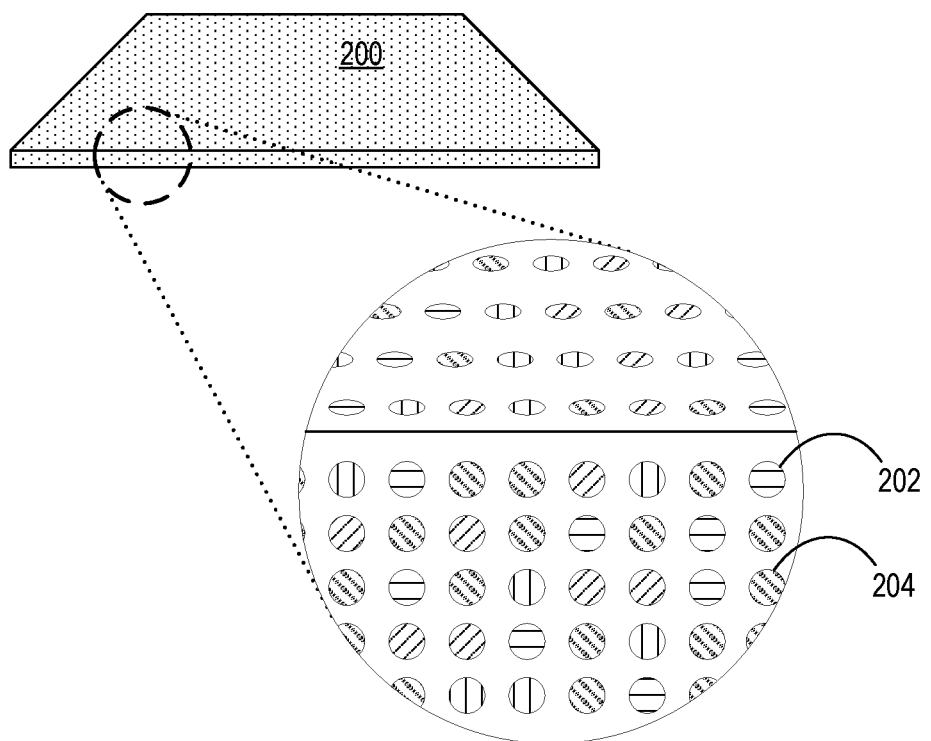
FIG. 2 shows a schematic depiction of a storage medium comprising data encoded as birefringent voxels.

In examples in which data is to be read from a plurality of layers of storage medium 105, variable-focus optics 110 may be used to adjust a focal plane of the detector 108, such that voxels at the focal plane are read while others are out-of-focus. In other examples, varying the focus can be achieved by moving the sample. FIG. 2 schematically shows an example storage medium 200 comprising multiple layers of voxels, two of which are illustrated at 202 and 204.

Figure 3:
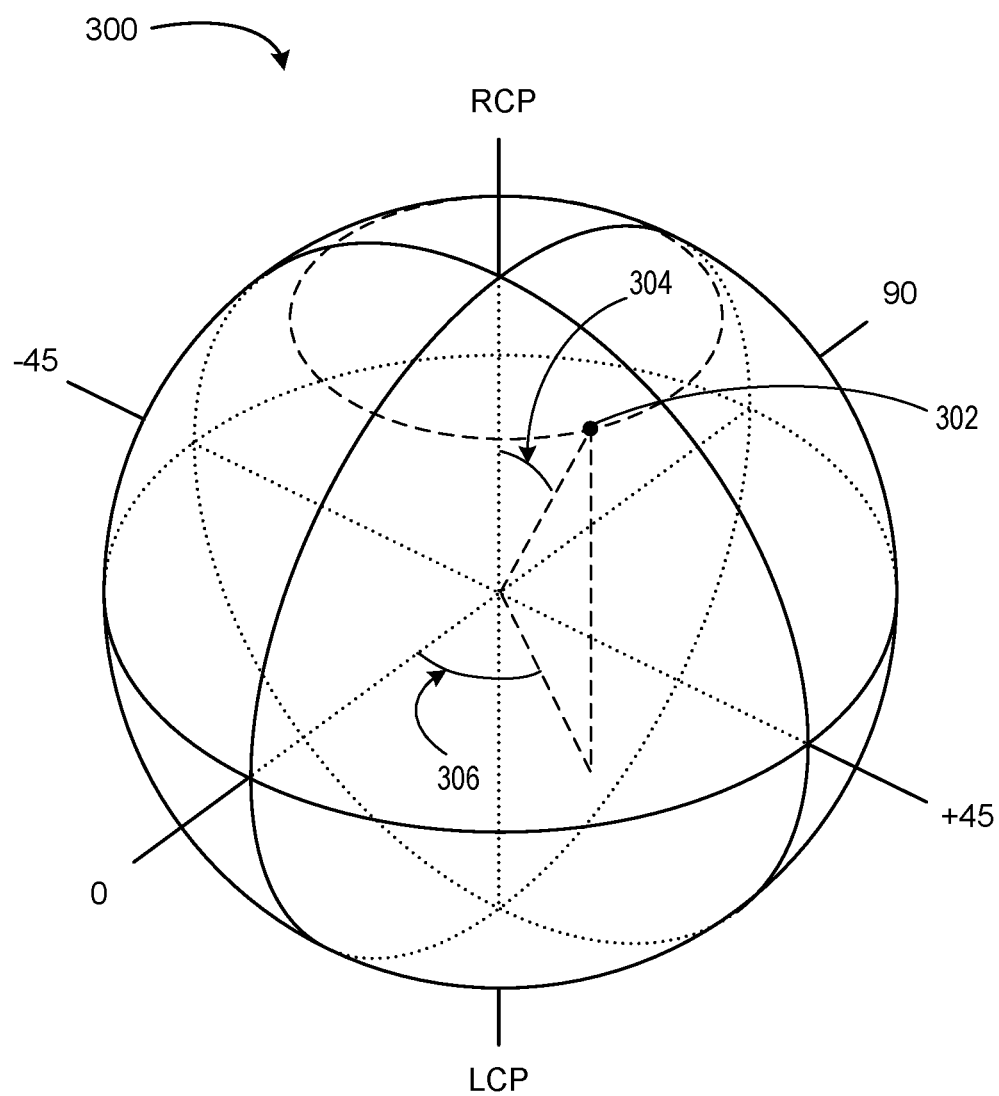
FIG. 3 shows a Poincaré sphere that represents polarization states as locations on the sphere.

To describe the measurement of a voxel that is made, a commonly used construction is the Poincare sphere, illustrated at 300 in FIG. 3. The Poincare sphere 300 is used to represent the polarization states of light by mapping the last three components of the 4-D Stokes vector onto a 3-D cartesian coordinate system. For fully polarized light, a particular measurement state is described by a particular position on the surface of the sphere representing a particular polarization state of light. Partially polarized light is represented by points inside from the surface of the Poincare sphere. The north pole represents RCP—right circularly polarized light. The south pole represents LCP—left circularly polarized light. The states on the equator are linear polarizations with angle defined by the azimuthal angle on the sphere. A general point on the sphere is elliptically polarized with ellipticity determined by the angle between the state and the pole, and azimuth defined by the angle around the sphere. An example polarization state is shown at 302 on the sphere. The black dashed curved line is a circle of constant latitude, and thus of constant retardance. The term "swing" refers to the angle 304 of the measurement state relative to the pole of the sphere. The horizontal angle is the azimuth 306. As the azimuth angle and retardance of the voxel leads to the output state of polarization of probe light, the azimuth angle and retardance of the voxel Current methods for determining birefringence values for a voxel of a storage medium involve three or more (typically four) measurements of the voxel taken at different probe light polarization states. Multiple measurements are used because the determination involves four degrees of freedom—the voxel retardance, the voxel azimuth angle, a measurement scale and a measurement offset. Four-measurement methods determine all four of these values for each read process. Shribak and Oldenbourg (M. Shribak and R. Oldenbourg, "Techniques for Fast and Sensitive Measurements of Two-Dimensional Birefringence Distributions" in Applied Optics, Volume 42, Issue 16, 2003, published by Optical Society of America, (www.osapublishing.org/ao/abstract.cfm?uri=ao-42-16-3009; see also doi.org/10.1364/AO.42.003009) describe a three-measurement method that assumes that the offset is zero, and solves for the other three parameters via the three measurements. However, the use of three or four measurements impact a speed at which data can be retrieved from storage, due to the number of measurements made.

Accordingly, example measurement processes are disclosed herein that may be used to determine azimuth angle and retardance values for a birefringent voxel using fewer than three measurements. Briefly, the disclosed methods utilize constraints on retardance values based upon prior knowledge of the retardance to allow retardance and azimuth angle values to be determined with two measurements, or even one measurement. The disclosed methods also may be used with three measurements, and offer the advantages over prior three-measurement methods that the offset does not need to be assumed to be zero as long as it is known prior to measurement, and that relative retardance and angle may be determined. As scale and offset do not vary significantly spatially or temporally in the context of reading data encoded as birefringence in a storage medium, the scale and offset may be determined one time or periodically using a four (or more) measurement technique, and then the determined scale and offset values may be used for subsequent determinations of retardance and angle using fewer than four measurements. Further, as described below, scale and offset, when not known, may be determined via numerical optimization techniques.

Figure 4:
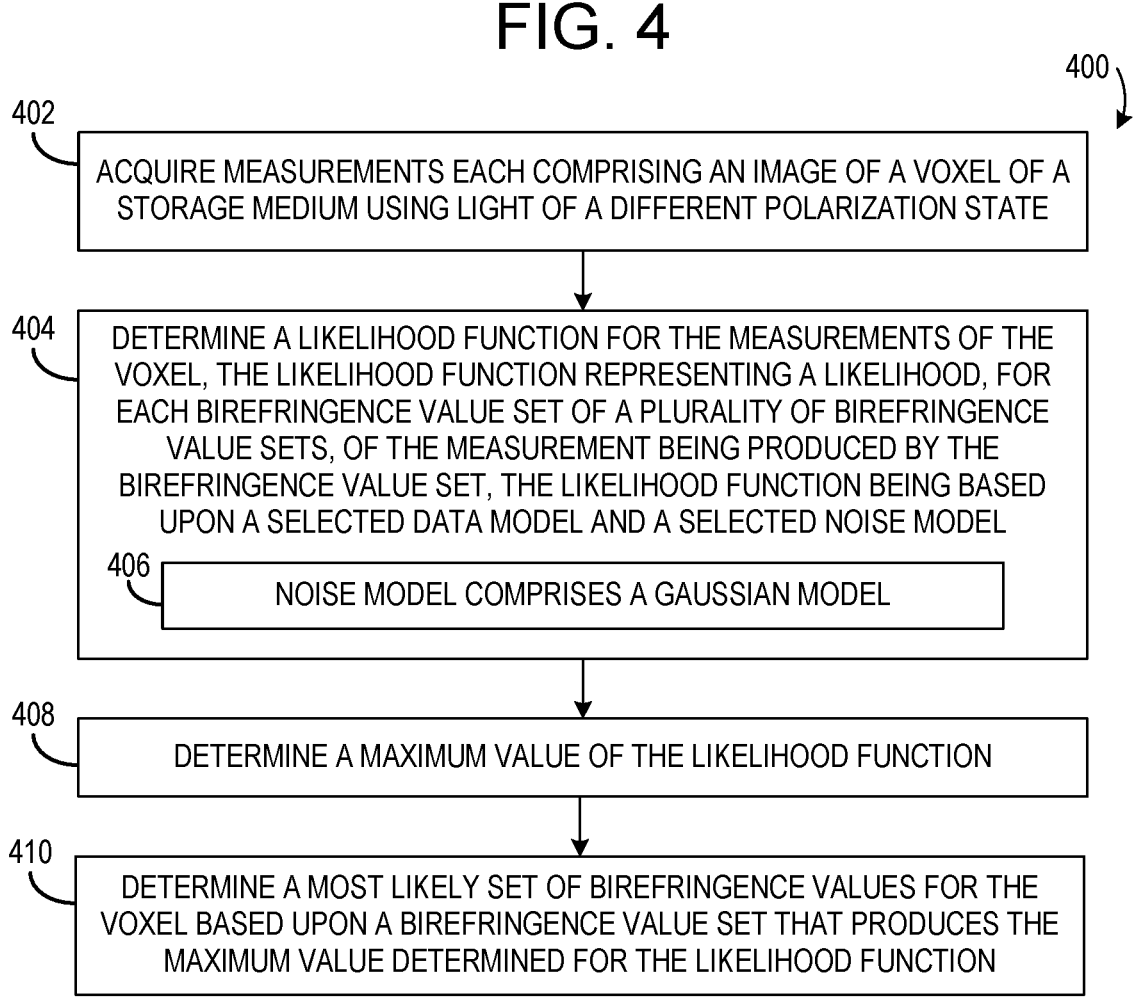
FIG. 4 shows a flow diagram depicting an example method for determining birefringence values based upon a maximum value determined for a likelihood function.

FIG. 4 shows a flow diagram illustrating an example method 400 for determining birefringence values. Method 400 is an example of a technique that can be used to determine scale and offset value for use for subsequent determinations using fewer measurements, and offers the advantage over current methods that arbitrary probe light polarization states may be used to make the determination, rather than predetermined states that may be hard to implement via physical instruments. Method 400 first comprises, at 402, acquiring four or more of measurements of a voxel at different polarization states, wherein each measurement comprises an observed intensity $m_k$ at measurement state k defined by a measurement polarization state with swing $\chi_k$ and angle $\theta_k$. Method 400 further comprises, at 404, determining a likelihood function for the measurements of the voxel, wherein the likelihood function represents, for each birefringence value set of a plurality of birefringence value sets, a likelihood of the measurements of the voxel being produced by the birefringence value set. The likelihood is determined as a function of angle and retardance using an assumption of a noise model and a model for the data. Any suitable data model and noise model may be used, including Gaussian, Poisson, and a combination of Gaussian and Poisson. As one example, a likelihood of measuring intensity $m_k$ given measurement state k using a Gaussian noise model (indicated at 406) is given by equation (1).

$$P(m_k \mid I_k) = (2\pi\sigma^2)^{-\frac{1}{2}} \exp\left(-\frac{(I_k - m_k)^2}{2\sigma^2}\right) \quad (1)$$

In equation (1), $I_k = a(1 - \cos\chi_k \cos\delta + \sin\chi_k \sin\delta \sin(2\phi - 2\theta)) + b$, where $I_k$ is the expected measurement taken for polarization state k, $\delta$ is the sample retardance, $\phi$ is the sample angle, $\alpha$ is the scale parameter, b is the offset, and $\sigma$ is the noise. The term "birefringence value set" indicates a set of values for $\{a, b, \delta, \phi\}$. Using this expression, a likelihood function to determine a likelihood of a set of measurements can be expressed as $$\{m_k\}_{k=1}^N, \text{ as } L = \prod_{k=1}^N P(m_k \mid I_k).$$

L is computed for a plurality of birefringence value sets, and a maximum value is determined for the likelihood function, as indicated at 408. The maximum value of the likelihood function then is used, at 410, to determine a most likely set of birefringence values for the set of measurements of the voxel based upon the set that produced the maximum determined value. This may be expressed mathematically as equation (2).

$$\{a,b,\delta,\phi\} = \mathrm{argmax}(L(a,b,\delta,\phi)) \quad (2)$$

The scale and offset determined may be used in determinations using three or fewer measurements. It will be understood that the term maximum determined value, and similar terms used herein, are not meant to indicate an actual global maximum for a likelihood function, but rather to represent a maximum observed value for all sets of parameters utilized. It further will be understood that, in other examples, any other suitable method may be used to determine the birefringence values including scale and offset. For example, in accordance with Bayes' theorem, it is also possible to include prior knowledge about angle or retardance distributions and instead of calculating the likelihood of the parameters, one can calculate the posterior. In this case one could find the values of the parameters that maximized the posterior (often this is called MAP—maximum a posteriori). In such examples, parameter values may be determined, for example, by finding the expectation of the posterior, or by using other statistical measures.

Figure 5:
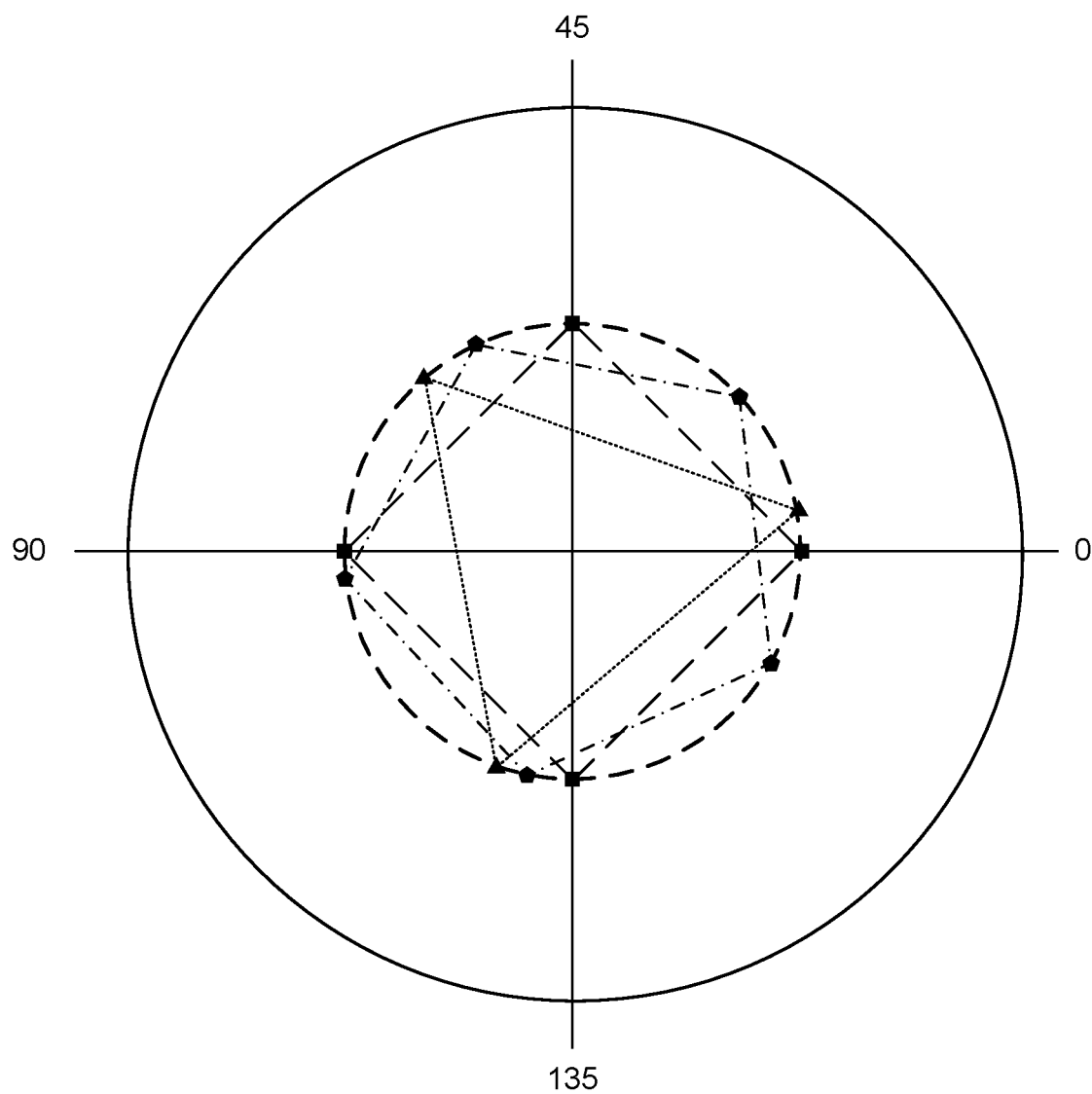
FIG. 5 shows examples of polarization states for measuring birefringence values.

As mentioned above, an advantage offered by the use of a maximum determined likelihood method to determine birefringence values for a voxel is that the polarization states used for the measurements may be arbitrary, rather than predetermined. Nevertheless, in some examples, some configurations of polarization states may provide for better use of available signal than other configurations of states. Two examples of such configurations are as follows. Referring again to the Poincare sphere of FIG. 3, a first example of a set of polarization states for determining birefringence values for voxel comprises a circularly polarized input state (as set by the PSG) with one-handedness, and elliptically polarized output states (as set by the PSA) with the opposite handedness to the input state and equal ellipticity to each other, but having varying azimuths that are spaced equally around half or all of a circle at an equal latitude on the Poincare sphere, such as at $\{0, 45, 90, 135\}$ degrees or $\{0, 22.5, 45, 67.5\}$ degrees. A second example set of polarization states comprises an output state circularly polarized with one handedness and input states that are elliptically polarized with the opposite handedness to the output state and equal ellipticity to each other but having varying azimuths, wherein the azimuths are equally spaced around half or all of a circle on the surface of the Poincare sphere. FIG. 5 depicts examples of three such polarization state configurations, each configuration denoted by points with a different symbol from the other configurations. In FIG. 5, the view of the Poincare sphere is along the polar axis of the sphere, the dashed circle corresponds to a selected latitude comprising the polarization states, and the outer border corresponds to the equator of the sphere.

When measurements are configured in this way, the azimuth angle of the voxel can be determined as follows:

$$\phi = \frac{1}{2}\arctan\left(\frac{\sum_{i=1}^N m_k \sin 2\theta_k}{\sum_{i=1}^N m_k \cos 2\theta_k}\right), N > 3 \quad (3)$$

Here $\phi$ is the measured angle, the index k indicates the measurement number with $m_k$ being the intensity of the $k^{th}$ measurement, and $2\theta_k$ being the angle of the $k^{th}$ measurement state on the Poincaré sphere. To find the retardance, one suitable method comprises numerically optimizing a likelihood of the data given the measurements, as described above with regard to FIG. 4.

As mentioned above, prior knowledge of the scale and offset parameters may be used to determine the azimuth angle and retardance of a voxel using a reduced number of measurements. For example, the azimuth angle for a voxel may be determined using three-measurements plus a known offset value by using equation (4).

$$\phi = \frac{1}{2}\arctan\left(\frac{\sum_{i=1}^N m_k \sin 2\theta_k}{\sum_{i=1}^N m_k \cos 2\theta_k}\right), N = 3 \quad (4)$$

The retardance may be found, for example, by numerical maximization of a likelihood function, as described above. Further, even where scale and offset are not initially known, numerical optimization techniques may be used to determine the scale and offset. In such examples, the scale and offset may be determined where information about the expected distribution of angles is known (as may be the case for previously written birefringent voxels). With prior knowledge of the expected distribution of angles, the scale and offset may be adjusted computationally until the expected distribution is achieved to a suitable approximation.

Where some prior information on the retardance is known, but the retardance value itself is not known, a two-measurement method may be used to determine birefringence values for a voxel. In some examples, the two-measurement method also utilizes prior knowledge of scale and offset, while in other examples, the scale and offset are determined by numerical optimization, as mentioned above.

When using two measurements, even with knowledge of the offset and scale, there are still two possible solutions for the retardance and angle of the sample. This is because each measurement restricts the solutions to lie on a 2D plane in the 3D space of the Poincare sphere. Therefore, the two measurements define a line in 3D. FIG. 6 illustrates examples of two-measurement determinations for a hypothetical voxel on Poincare sphere 602. In this example, the line 604 defined by the two measurements for the voxel intersects the surface of the sphere at two points 606 and 608.

To determine which of the two points corresponds to the actual birefringence values of the voxel that was measured, a constraint is applied that selects the point with the lower retardance as corresponding to the state of the voxel, as it can be shown mathematically that the other solution is at least as large as the effective retardance of the measurement states. For example, given the two measurements in Poincare sphere 602, point 606 would be selected since it represents a lower retardance value compared to point 608. This prior information-based constraint may be used in any system where the effective measurement retardance is known to be different (either larger or smaller) than the measurement retardance. This constraint narrows down the solution to one point on the sphere, which allows the sample retardance and azimuth to be determined.

A more detailed mathematical description of an example two-measurement methods is as follows. It will be noted that the method may be performed either by using values for scale and offset that are initially determined using a greater number of measurements (e.g. four), and then applied to the two-measurement determinations, or by determining scale and offset values using numerical optimization methods. Where values for scale and offset are determined initially, any suitable method to determine these parameters may be used, including the maximum likelihood example described above with regard to FIG. 4.

After acquiring measurements, the example two-measurement method first involves solving the following set of simultaneous equations (5, 6, 7) for the retardance $\delta$:

$$m_1 = a(1 - \cos\chi_1 \cos\delta + \sin\chi_1 \sin\delta \sin(2\phi - 2\theta_1)) + b \quad (5)$$

$$m_2 = a(1 - \cos\chi_2 \cos\delta + \sin\chi_2 \sin\delta \sin(2\phi - 2\theta_2)) + b \quad (6)$$

$$(\sin\delta \sin(2\phi - 2\theta_1))^2 + (\sin\delta \sin(2\phi - 2\theta_2))^2 + \cos^2\delta = 1 \quad (7)$$

As there are two possible solutions for $\delta$, the smaller value is selected, as described above. Next, the azimuth angle can be computed using equation (8), $$\phi = \frac{1}{2}\arctan\left(\frac{\sin(2\phi - 2\theta_1)}{\sin(2\phi - 2\theta_2)}\right) + \theta_2 - \theta_1 \quad (8)$$

when mod $$\left(\theta_2 - \theta_1, \frac{\pi}{2}\right) = \frac{\pi}{4}.$$

Where known values of the scale and offset were used in this determination, then the determination is complete at this stage. On the other hand, where assumed scale and offset values were used, then prior information may be used to adjust a and b. For example, where the distribution of angles will be uniform (as may be the case with birefringent data, where the writing process for the data is known), then the distribution of angles may be computed, and equations (5)-(7) and (8) may be repeatedly determined while adjusting a and b until the measured angular histogram is sufficiently similar to the expected one.

Where the retardance of a voxel is known (as the case may be where the birefringence writing properties are known), birefringence values may be determined via a single measurement, again using known or assumed values for the scale and offset parameters. Where assumed values are used, the values can be numerically optimized. Based upon the known or assumed scale and offset values, the single measurement 612 defines a two-dimensional plane in three-dimensional space, with reference to the Poincaré sphere 610 of FIG. 6. This two-dimensional plane intersects the surface of the sphere along a circle 614, where the circle represents a continuous range of possible sample angles and retardance values. Where the sample retardance (represented by angle 616) is known accurately, then the angle can be determined to within one of two values (represented by points 620 and 622), namely, where the retardance plane 618 intersects the measurement circle 614. In comparison, the above-described two-measurement example utilized less-detailed prior information, namely, that the retardance is less than the swing. Where it is known that the angle is in some range that spans only half of the total available angles, for example between 0 and 90 degrees, or between 45 and 135 degrees (or any other 90 degree range) then these two points can be restricted down to one, which determines the retardance and angle of the specimen. Mathematically, the computation to perform the disclosed example one-measurement determination is expressed by equations (9) and (10).

$$m_1 = a(1 - \cos\chi_1 \cos\delta + \sin\chi_1 \sin\delta \sin(2\phi - 2\theta_1)) + b \quad (9)$$

$$\phi = \frac{1}{2}\arcsin\left(\frac{1 - \frac{(m_1 - b)}{a}\cos\chi_1\cos\delta}{\sin\chi_1\sin\delta}\right) + \theta_1 \quad (10)$$

Figure 7:
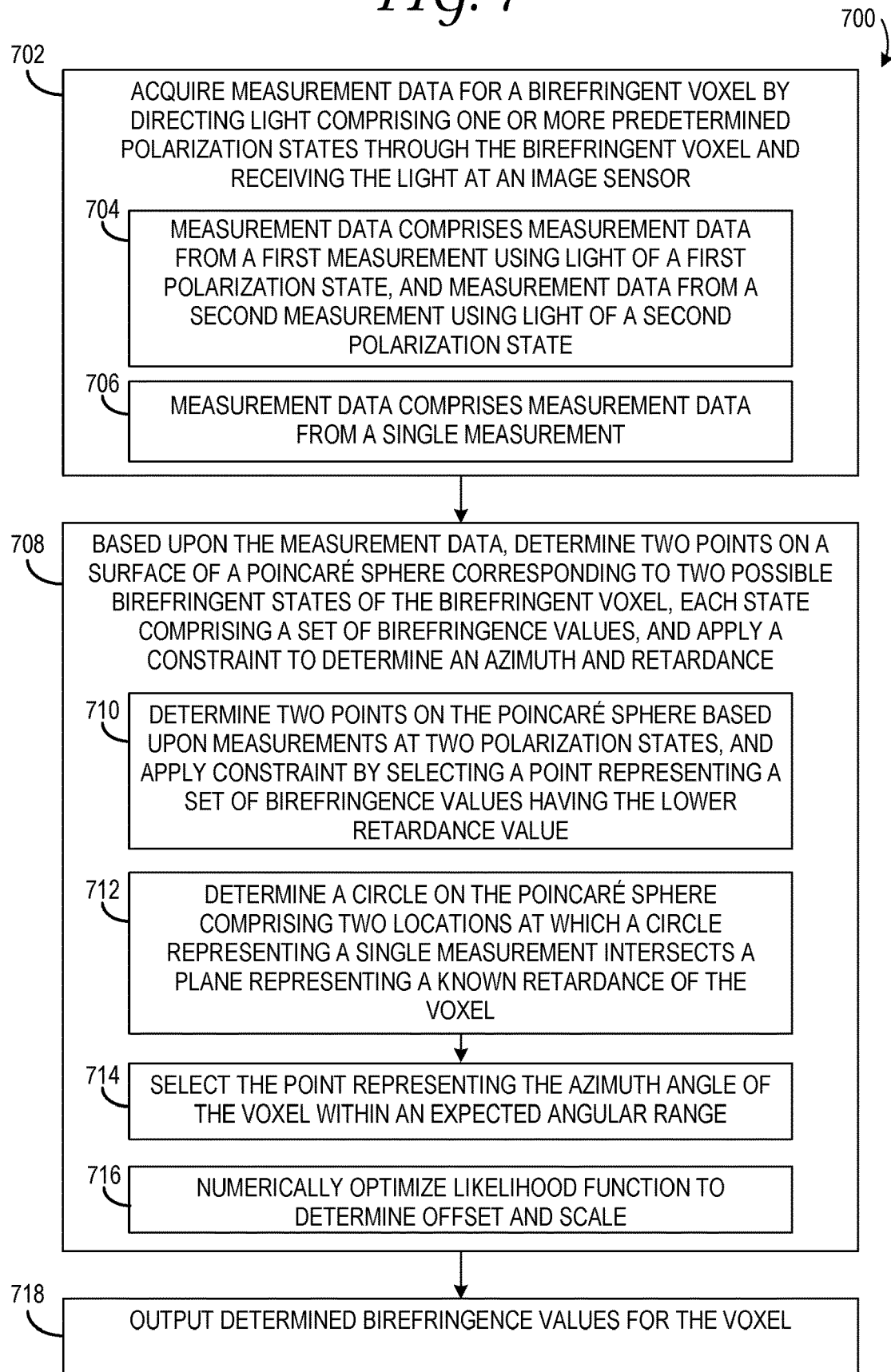
FIG. 7 shows a flow diagram depicting an example method for acquiring birefringence measurements using wavelength multiplexing.

FIG. 7 shows a flow diagram depicting an example method 700 for determining birefringence values for a voxel using two or fewer measurements. As described above, the method of FIG. 7 may utilize scale and offset parameters determined via the method of FIG. 4, or may initially assume and then numerically optimize these parameters. Method 700 comprises, at 702, acquiring measurement data for a birefringent voxel by directing probe light comprising one or more predetermined polarization states through the birefringent voxel and receiving the light at the image sensor. In some examples, as indicated at 704, the measurement data may comprise measurement data acquired using light of a first polarization state, and measurement data acquired using light of a second, different polarization state. In other examples, the measurement data may comprise data from a single measurement, as indicated at 706.

Continuing, method 700 comprises, at 708, based upon the measurement data, determining two points on a surface of a Poincaré sphere corresponding to two possible birefringent states of the birefringent voxel each state comprising a set of birefringence values, and applying a constraint to determine birefringence values for the voxel. For example, where measurements are taken at two polarization states, two azimuth angle solution exist to equations (5)-(7) above. In this instance, method 700 comprises, at 710, applying a constraint specifying that the set of birefringence values having the lower retardance value is the correct set. By selecting the point on the Poincaré sphere that represents the lower retardance, the azimuth angle may be solved using equation 8 above, thereby providing a determined set of birefringence values for the voxel.

Where a single measurement is used, method 700 comprises, at 712, determining a circle on the surface of the Poincare sphere based upon the measurement, the circle comprising two locations that intersect a plane representing a known retardance of the voxel. Then, at 714, the point representing the birefringence values of the voxel may be selected based upon the azimuth angle of the point being within an expected range of angles, and the birefringence values may be determined using equations (9) and (10) above. Method 700 further optionally comprises, at 716, numerically optimizing a likelihood function based upon the determined azimuth and retardance values to determine scale and offset values in instances where these values are not known initially. Method 700 further comprises, at 718, outputting the birefringence values of the voxel.

The above-described examples may help to reduce the time and computing resources consumed when reading birefringent voxels in a storage medium compared to methods that use four or more measurements. Other processes also may alternatively or additionally be used to provide for the efficient reading of birefringent voxels. For example, wavelength multiplexing may be used to reduce a number of individual images acquired during a reading process.

Figure 8:
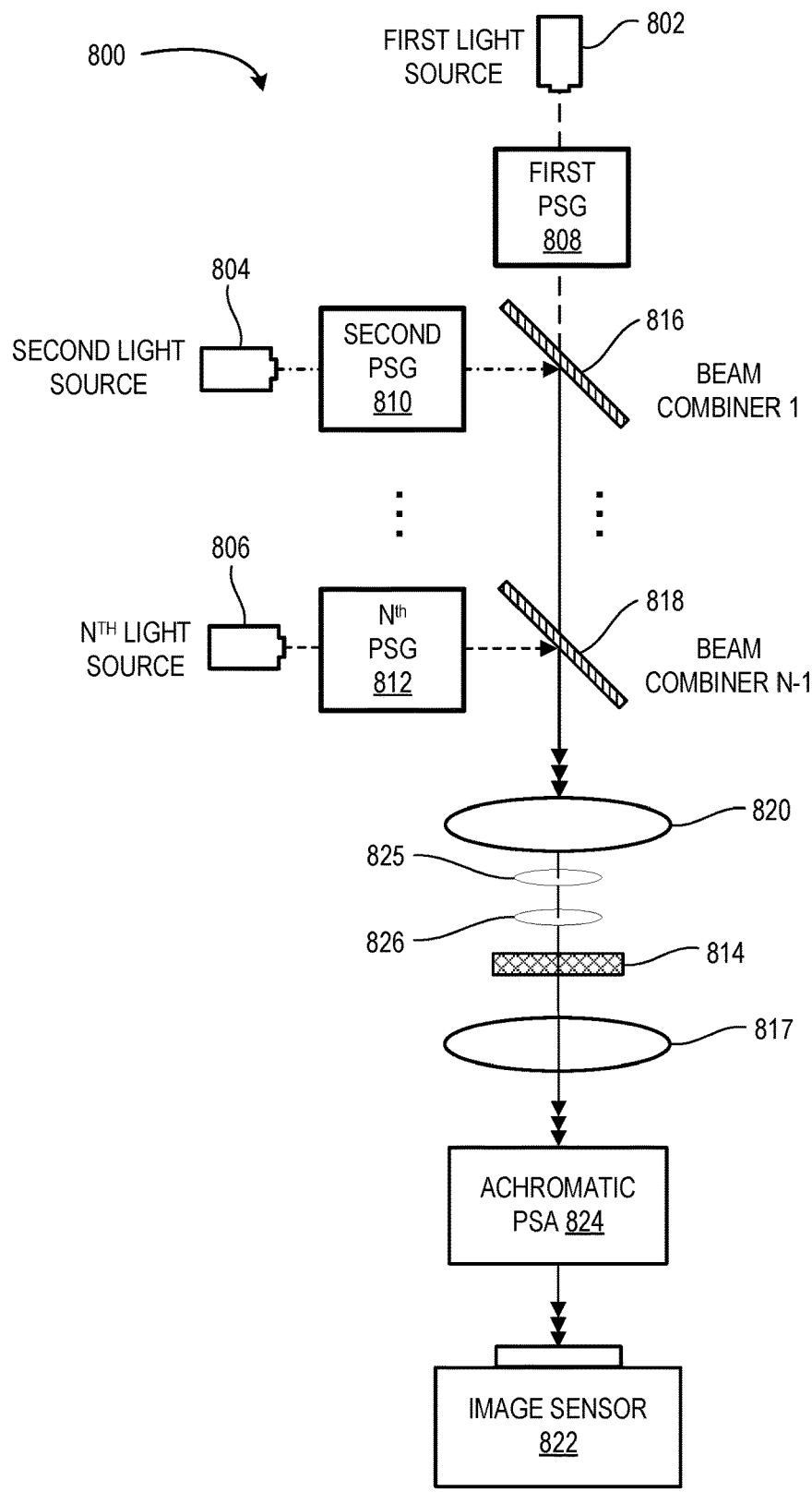
FIG. 8 shows a block diagram of an example system for reading birefringent data utilizing wavelength multiplexing.

FIG. 8 shows a schematic depiction of an example system 800 for reading birefringent storage media. System 800 utilizes wavelength multiplexing in which N different wavelength bands of light having different polarization states are multiplexed to acquire a number N of measurements in a temporally overlapping manner. System 800 comprises N light sources, illustrated as first light source 802, second light source 804, and $N^{th}$ light source 806, each configured to output light of a different wavelength band (e.g. red, green and blue). Each light source directs light into a corresponding PSG, shown respectively for light sources 802, 804 and 806 as PSG 808, PSG 810, and PSG 812, to allow a different polarization state to be set for each wavelength band. In other examples, a system to perform two temporally overlapping measurements may have two light sources and corresponding PSGs.

Light from each PSG is directed toward a storage medium 814 that is placed in a sample region of the system for reading the storage medium. The term "sample region" is used herein to represent a location at which a storage medium is placed for reading. In the depicted example, N−1 beam combiners (illustrated as beam combiner 1 816 and beam combiner N−1 818) are used to combine the light from each PSG into a beam for probing the sample medium.

In the depicted embodiment, an optic in the form of a condenser lens 820 directs light through the storage medium, and an objective lens 817 focuses the light onto a detector in the form of an image sensor 822 that images an entirety of a data layer within the storage medium 814 per image frame. An achromatic PSA 824 is positioned between the storage medium and the image sensor 822. The image sensor 822 comprises a plurality of integrated wavelength-selective bandpass filters, such that light of different wavelength bands passes through different filters and onto different areas of a pixel of the image sensor 822. In this manner, an intensity of each wavelength band of light (each of which has a different polarization setting) may be measured in a same image frame.

In some examples, one or more physical masks may be used for pupil engineering to help enhance a quality of a signal used to read birefringence-encoded data in a storage medium. Example masks that may be used are illustrated schematically as intensity mask 825 and phase mask 826. The engineering of the pupil may depend upon a layout (e.g. an x,y,z spatial distribution) of voxels in a storage medium. For example, a ring-shaped intensity mask added to the pupil of a lens generates a Bessel beam rather than the conventional Gaussian beam. Phase masks can also be applied to engineer the polarization field at sample plane, to optimize the pupil profile for the intended type of birefringence distribution of the sample. Thus, if a specific measuring optical probe is desirable, by engineering the shape of the input light, the signals that can be used as input for these methods can be tailored with the purpose of enhancing the quality of the measurements.

In some examples, adjustable focus optics may be moved to selectively focus voxels at particular layers within a volume of the storage medium 814, and thereby allow the reading of different layers. In other examples, the storage medium may be moved to focus on voxels in different layers. While the depicted image sensor includes integrated bandpass filters, in other examples bandpass filters may be included elsewhere in a system. For example, a system may utilize plural PSGs and wavelength multiplexing in combination with a rotating bandpass filter (e.g. a color wheel) to allow the sequential acquisition of images of different polarization states.

Figure 9:
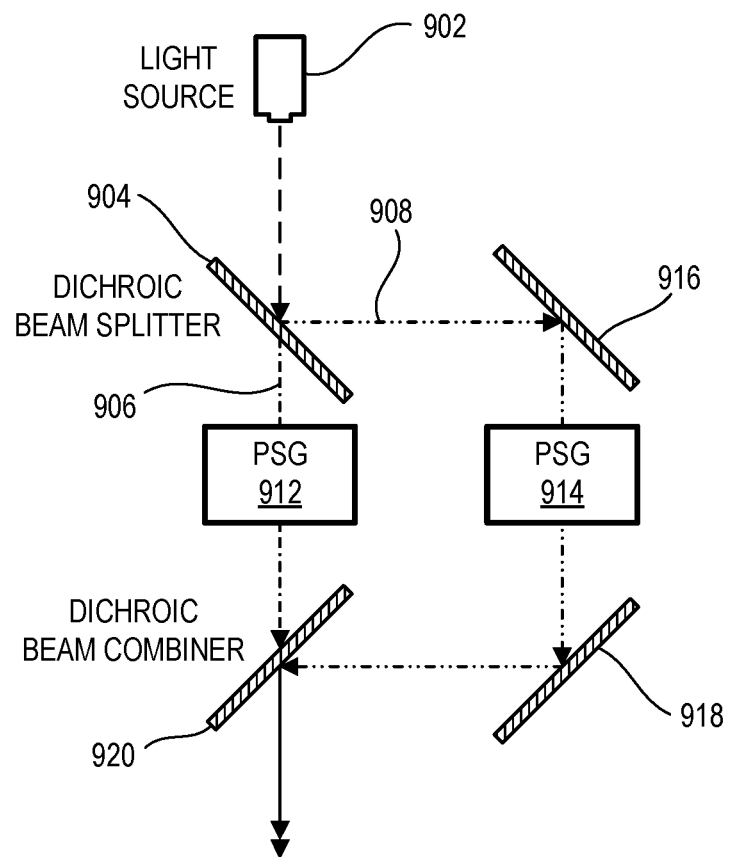
FIG. 9 shows an example system for wavelength multiplexing light of different polarization states using light from a same image source.

As mentioned above, in some examples a lesser number of light sources may be used to produce a greater number of wavelength bands having different polarization states. FIG. 9 shows an example light source configuration in which light from a single light source 902 is split via a dichroic beam splitter 904 into two beams 906, 908 of different wavelength bands. Beams 906 and 908 are directed through respective PSGs 912, 914 using any suitable optics (such as mirrors 916, 918 in the depicted example), and PSGs 912, 914 set different polarization states for beams 906 and 908. After passing through the PSGs, beams 906, 908 are combined with dichroic beam combiner 920 for probing a storage medium. In other examples, light from a suitable light source may be split into three or more different wavelength bands.

Figure 10A:
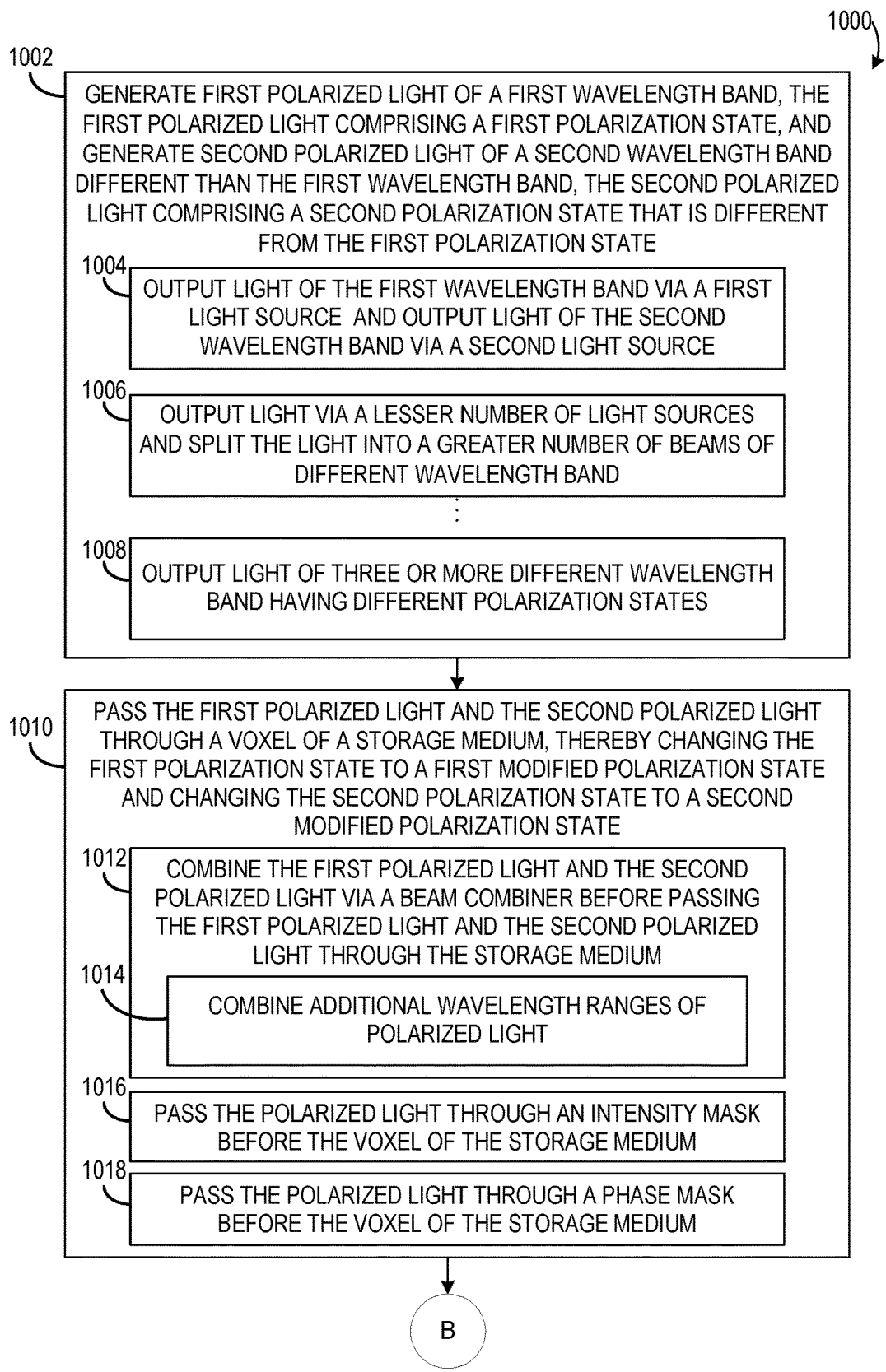
FIGS. 10A-10B show a flow diagram depicting an example method for measuring a birefringent voxel via wavelength multiplexing.
Figure 10B:
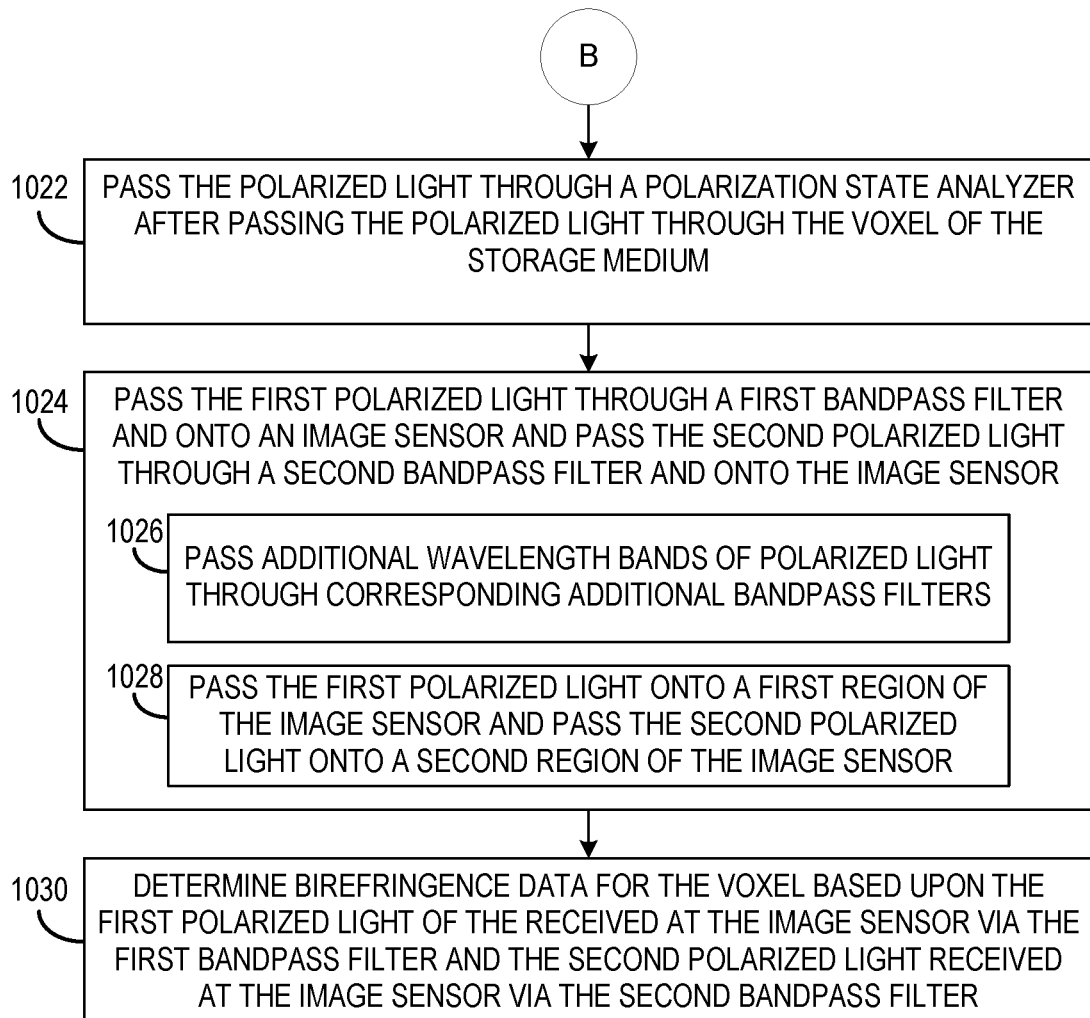

FIGS. 10A-10B show a flow diagram depicting an example method 1000 for acquiring plural temporally overlapping measurements via wavelength multiplexing. First, referring to FIG. 10A, method 1000 comprises, at 1002, generating first polarized light of a first wavelength band, the first polarized light comprising a first polarization state, and generating second polarized light of a second wavelength band different than the first wavelength band, the second polarized light comprising a second polarization state that is different from the first polarization state. In some examples, light of the first wavelength band is output via a first light source and light of the second wavelength band is output by a second light source, as indicated at 1004. In other examples, light may be output from a lesser number of light sources, and then split into a greater number of beams of different wavelength bands, as indicated at 1006. Further, it will be understood that additional wavelength bands beyond two may be used. As such, method 1000 may comprise, at 1008, outputting light of three or more different wavelength bands having different polarization states to generate third polarized light and potentially additional other polarized light beams.

Continuing, method 1000 comprises, at 1010, passing the first polarized light and the second polarized light through a voxel of a storage medium, thereby changing the first polarization state of the first polarized light to a first modified polarization state, and changing the second polarization state of the second polarized light to a second modified polarization state. Passing the first polarized light and the second polarized light through the voxel of the storage medium may comprise, at 1012, combining the first polarized light and the second polarized light via a beam combiner before passing the first and second polarized light through the storage medium. Further, process 1010 also may comprise, at 1014, combining third polarized light, and any additional wavelength bands of polarized light, with the first and second polarized light before passing the light through the storage medium. In some examples, one or more masks may be used to implement an engineered pupil. As such, method 1000 may comprise, at 1016, passing the polarized light through an intensity mask before passing the polarized light through the voxel of the storage medium. Alternatively or additionally, method 1000 may comprise, at 1018, passing the polarized light through a phase mask before passing the polarized light through a voxel of the storage medium.

Next referring to FIG. 10B, method 1000 comprises, at 1022, passing the first polarized light, the second polarized light and any additional wavelength bands of polarized light through a polarization state analyzer after passing the polarized light through the voxel of the storage medium, wherein the analyzer attenuates an intensity of the light based upon a polarization state of the light compared to a state of the analyzer. Then, at 1024, method 1000 comprises passing the first polarized light through a first bandpass filter onto the image sensor, and passing the second polarized light through a second bandpass filter and onto the image sensor, wherein the first bandpass filter selectively passes the first wavelength band and the second bandpass filter selectively passes the second wavelength band. Further, as indicated at 1026, additional wavelength bands of polarized light having different polarization states may be passed through corresponding additional bandpass filters. In this manner, intensities of the first wavelength band, the second wavelength band, and any additional wavelength bands, are separately imaged.

In some examples, the first bandpass filter, the second bandpass filter, and any additional bandpass filters are integrated with the image sensor as spatially separate filters integrated with a pixel of the image sensor. In such examples, method 1000 comprises, at 1028, passing the first polarized light onto a first region of the image sensor, passing the second polarized light onto a second region of the image sensor, and passing any additional wavelength bands of polarized light onto the image sensor. In this manner, images for each polarization state can be separately acquired in a same image frame. In other examples, the different bandpass filters may be applied in a time-multiplexed manner, such as by a color wheel. In such examples, different image frames are acquired for each wavelength band. After acquiring the measurements using the different wavelength bands for different polarization settings, method 1000 comprises, at 1030, determining birefringence values for the voxel based upon the first polarized light received at the image sensor via the first bandpass filter and the second polarized light received at the image sensor via the second bandpass filter, plus any additional wavelength-multiplexed polarized light. The birefringence values may be determined using the example methods disclosed above, or in any other suitable manner.

With any of the above-described methods, the system and medium that probe light passes through when probing a voxel can impart additional rotation and/or retardance on the polarized light used to probe voxel. For example, reading a layer of voxels in a data storage medium comprising a three-dimensional array of voxels may result in a state of polarized probe light being rotated by passing through other out-of-focus layers of voxels in a read process. System imperfections also may lead to background noise. As such, it is often of interest to measure the birefringent properties of a sample such as a data storage medium relative to imperfections in the system and storage medium (e.g. the presence of other voxels in the optical path that are not being read). This is referred to as background subtraction.

Current methods involve the removal of background signal by capturing a set of images $\{b_k\}$ in addition to the measurement set $\{m_k\}$ and computing the angle and retardance of the background. The $\{b_k\}$ are captured using the same instrument with the same set of polarization states as the $\{m_k\}$. The $\{b_k\}$, are captured simply by removing the actual sample from the field of view. It is also possible to estimate $\{b_k\}$ from $\{m_k\}$ by for example performing a blurring operation. The blur can be achieved by a simple low-pass filter. However, such methods may not correct adequately for both system imperfections and sample imperfections such as other voxels.

As such, examples are disclosed that relate to estimating $\{b_k\}$ from $\{m_k\}$ based on a two-step process in which two low-passed versions of the measured intensities are calculated and combined using a multiplicative constant to form an enhanced background image. In this manner, both a local and a global background intensity are estimated, which may represent a more accurate estimation for the background intensities at the large and small scales, as the large-scale background may compensate for the imperfect system while the small-scale background may compensate for the three-dimensional nature of the storage medium. The filter parameters and multiplicative constant may be derived, for example, by performing a minimization of an error between a known specimen's retardance and calculated retardance distributions. Such a background correction method may be more efficient than separately acquiring a background image for the system (e.g. without a data storage medium present in the sample region), as fewer physical measurement processes are performed, thereby saving time and resources utilized for a separate physical background measurement. As a more specific example, for a sample with known data encoded into the glass and for which a set of image frames have been acquired, initial filter parameters and multiplicative constant are set, and the encoded data is decoded. This is repeated with updated filter parameters and multiplicative constant. The parameters and multiplicative constant that give a determined lowest error in decoding are then selected. The process of updating the filter parameters can be a brute search in the parameter space or a gradient method in various examples.

Figure 11:
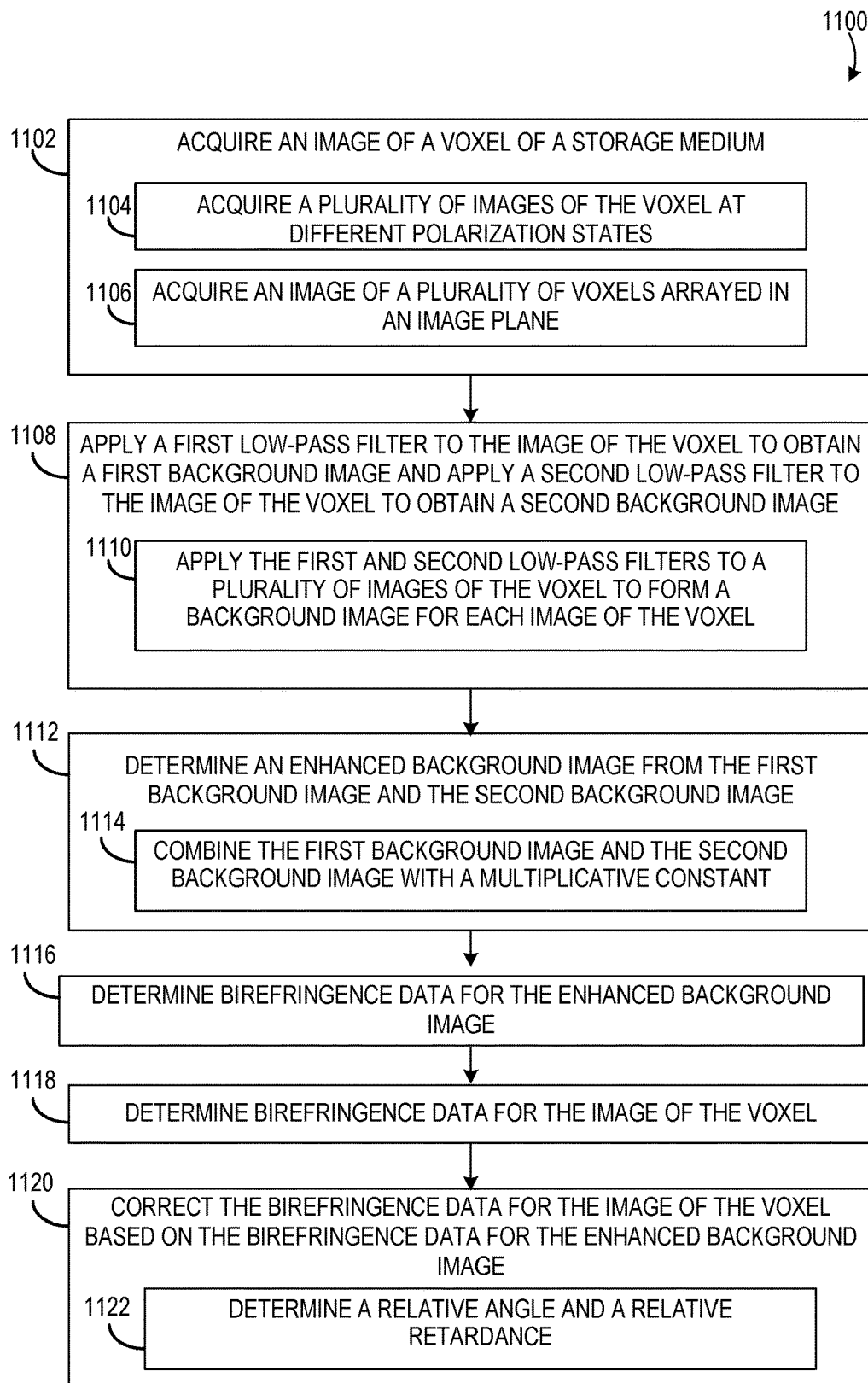
FIG. 11 shows a flow diagram depicting an example method for performing background correction for birefringence values.

FIG. 11 shows a flow diagram depicting an example method 1100 for correcting birefringence values using a plurality of low-pass filters. Method 1100 comprises, at 1102, acquiring an intensity image of a voxel of a storage medium. To measure the birefringence of the voxel, multiple images of the voxel are acquired at different polarization states, as indicated at 1104. In some examples, the image may be of a plurality of voxels arrayed in an image plane within the storage medium, as indicated at 1106. The image of the voxel comprises higher frequency image information arising from a birefringence state of the voxel and lower frequency image information arising from one or more birefringent regions of the storage medium other than the voxel.

At 1108, method 1100 comprises applying a first low-pass filter to the image of the voxel to obtain a first background image, and applying a second low-pass filter to the image of the voxel to obtain a second background image. As described above, the first and second low-pass filters have different cut-off frequencies, such that the first background image may represent more local background characteristics, such as birefringence noise arising from other voxels in the storage medium, while the second background image may have a lower cut-of frequency than the first low-pass filter and represent more global background characteristics. The effect of the more localized low-pass filter may be to remove high-frequency data representing more detailed features of a voxel that is in focus, thereby leaving less detailed features from other voxels that are out-of-focus during the read process. As indicated at 1110, the first and second low-pass filters are applied to each measurement image acquired for the voxel to form a background image for each measurement image.

Continuing, method 1100 includes, at 1112, determining an enhanced background image from the first background image and the second background image. The enhanced background image may be determined in any suitable manner. In some example, the enhanced background image may be determined by combining the first background image and the second background image using a multiplicative constant, as indicated at 1114. A more specific example utilizes the following equation:

$$b_k = \alpha(\text{LowPass}_1(m_k) - \text{LowPass}_2(m_k)) + \text{LowPass}_2(m_k), \quad (11)$$

where measured intensities=$m_k$, local background intensities are represented by $\text{LowPass}_1(m_k)$, global background intensities are represented by $\text{LowPass}_2(m_k)$, $\alpha$ is a multiplicative constant used as a scale factor, and $b_k$ is the enhanced background image.

Method 1100 further includes, at 1116, determining birefringence values for the enhanced background image and, at 118, birefringence values for the image of the voxel. Each set of birefringence values comprises a retardance value and an azimuth value angle, and may be determined using the examples described above, or in any other suitable manner.

Method 1100 further comprises, at 1120, correcting the birefringence values for the image of the voxel based on the birefringence values for the enhanced background image. Correcting the birefringence values for the image may comprise, for example, determining a relative rotation and relative retardance of the birefringence values for the image of the voxel compared to the birefringence values for the enhanced background image, as indicated at 1122. In one example, measurement retardance $\delta_m$ and angle $\theta_m$ are from $\{m_k\}$, and the background retardance $\delta_b$ and angle $\theta_b$ are determined from $\{b_k\}$, for example, using any of the methods described above, or other suitable method. The relative angle $\delta_r$ and retardance $\delta_r$ are determined by the following equations.

$$\delta_r \sin 2\theta_r = \delta_m \sin 2\theta_m - \delta_b \sin 2\theta_b = U, \quad (12)$$

$$\delta_r \cos 2\theta_r = \delta_m \sin 2\theta_m - \delta_b \sin 2\theta_b = V, \quad (13)$$

$$\delta_r = \sqrt{U^2 + V^2}, \quad (14)$$

$$\theta_r = \frac{1}{2}\arctan\left(\frac{U}{V}\right) \quad (15)$$

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
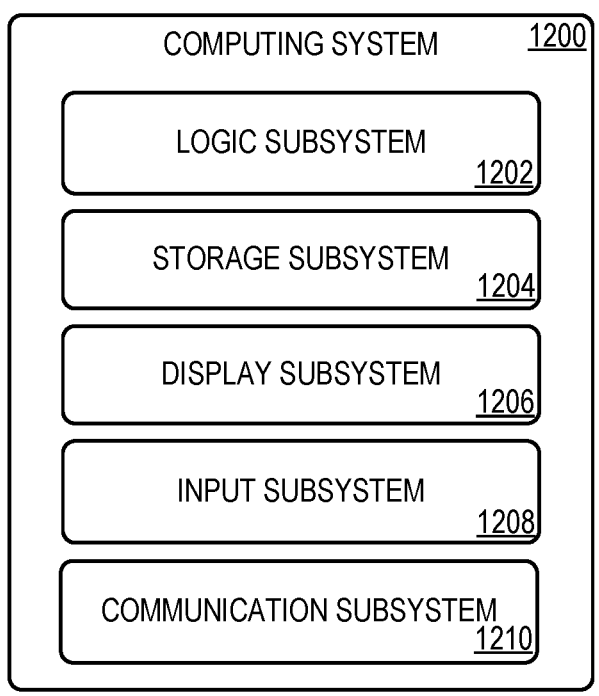
FIG. 12 shows a block diagram of an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic subsystem 1202 and a storage subsystem 1204. Computing system 1200 may optionally include a display subsystem 1206, input subsystem 1208, communication subsystem 1210, and/or other components not shown in FIG. 12.

Logic subsystem 1202 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1204 includes one or more physical devices configured to hold instructions executable by the logic subsystem to implement the methods and processes described herein. When such methods and processes are implemented, the state of storage subsystem 1204 may be transformed—e.g., to hold different data.

Storage subsystem 1204 may include removable and/or built-in devices. Storage subsystem 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1204 may include volatile, nonvolatile, dynamic, static, read/write, read-only, random-access, sequential-access, location-addressable, file-addressable, and/or content-addressable devices.

It will be appreciated that storage subsystem 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1202 and storage subsystem 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1200 implemented to perform a particular function. In some cases a program may be instantiated via logic subsystem 1202 executing instructions held by storage subsystem 1204. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage subsystem 1204. This visual representation may take the form of a graphical user interface (GUI). As the herein described methods and processes change the data held by the storage subsystem, and thus transform the state of the storage subsystem, the state of display subsystem 1206 may likewise be transformed to visually represent changes in the underlying data. Display subsystem 1206 may include one or more display devices utilizing virtually any type of technology. Such display devices may be combined with logic subsystem 1202 and/or storage subsystem 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a computer-implemented method for reading data stored as birefringence values in a storage medium, the method comprising acquiring an image of a voxel of the storage medium, the image of the voxel comprising higher frequency image information arising from a birefringence state of the voxel and lower frequency image information arising from one or more birefringent regions of the storage medium other than the voxel, applying a first low-pass filter with a first cutoff frequency to the image of the voxel to obtain a first background image, applying a second low-pass filter with a second cutoff frequency to the image of the voxel to obtain a second background image, the second cutoff frequency being different than the first cutoff frequency, determining an enhanced background image from the first background image and the second background image, determining birefringence values for the enhanced background image, determining birefringence values for the image of the voxel, and correcting the birefringence values for the image of the voxel based upon the birefringence values for the enhanced background image. In some such examples, acquiring the image of the voxel of the storage medium comprises acquiring a plurality of images of the voxel at different polarization states, and wherein applying the first low-pass filter and the second low-pass filter to the image of the voxel comprises applying the first low-pass filter and the second low-pass filter to each image of the plurality of images of the voxel. In some such examples, determining the enhanced background image comprises combining the first background image and the second background image with a multiplicative constant. In some such examples, the enhanced background image for image $m_k$ of the voxel acquired at polarization state k is denoted as $b_k$ and is determined by:

$$b_k = \alpha(\text{LowPass}_1(m_k) - \text{LowPass}_2(m_k)) + \text{LowPass}_2(m_k)$$

wherein the first low-pass filter is $\text{LowPass}_1$, the second low-pass filter is $\text{LowPass}_2$, and $\alpha$ is the multiplicative constant. In some such examples, t the birefringence values for the enhanced background image comprises a background retardance $\delta_b$ and a background angle $\theta_b$ determined from $b_k$, wherein the birefringence values for the image of the voxel comprises a measurement retardance $\delta_m$ and a measurement angle $\theta_m$ determined from $m_k$, and wherein the method further comprises correcting the birefringence values by determining a relative angle $\theta_r$ and a relative retardance $\delta_r$ by $$\delta_r \sin 2\theta_r = \delta_m \sin 2\theta_m - \delta_b \sin 2\theta_b = U,$$

$$\delta_r \cos 2\theta_r = \delta_m \sin 2\theta_m - \delta_b \sin 2\theta_b = V,$$

$$\delta_r = \sqrt{U^2+V^2}, \text{ and}$$

$$\theta_r = \frac{1}{2}\arctan\left(\frac{U}{V}\right).$$

In some such examples, the method further comprises determining a based upon optimizing an error between a retardance of a known specimen and calculated retardance distributions. In some such examples, acquiring the image of the voxel comprises acquiring an image of an array of voxels in an image plane, and wherein the one or more birefringent regions of the storage medium other than the voxel comprises one or more other voxels outside of the image plane.

Another example provides a computer system, comprising a logic subsystem, and a storage subsystem comprising instructions executable by the logic subsystem to read birefringent data from a storage medium by receiving an image of a voxel of the storage medium, the image comprising higher frequency image information arising from a birefringence state of the voxel and lower frequency image information arising from one or more birefringent regions of the storage medium other than the voxel, applying a first low-pass filter with a first cutoff frequency to the image of the voxel to obtain a first background image, applying a second low-pass filter with a second cutoff frequency to the image of the voxel to obtain a second background image, the second cutoff frequency being different than the first cutoff frequency, determining an enhanced background image from the first background image and the second background image, determining birefringence values for the enhanced background image, determining birefringence values for the image of the voxel, and correcting the birefringence values for the image of the voxel based upon the birefringence values for the enhanced background image. In some such examples, the instructions executable to acquire the image of the voxel of the storage medium are executable to acquire a plurality of images of the voxel at different polarization states, and to apply the first low-pass filter and the second low-pass filter to each image of the plurality of images of the voxel. In some such examples, the instructions executable to determine the enhanced background image comprise instructions executable to combining the first background image and the second background image with a multiplicative constant. In some such examples, the enhanced background image for image $m_k$ of the voxel acquired at polarization state k is denoted as $b_k$ and wherein the instructions are executable to determine $b_k$ by $$b_k = \alpha(\text{LowPass}_1(m_k) - \text{LowPass}_2(m_k)) + \text{LowPass}_2(m_k)$$

wherein the first low-pass filter is $\text{LowPass}_1$, the second low-pass filter is $\text{LowPass}_2$, and $\alpha$ is the multiplicative constant. In some such examples, the birefringence values for the enhanced background image comprises a background retardance $\delta_b$ and a background angle $\theta_b$ determined from $b_k$, wherein the birefringence values for the image of the voxel comprises a measurement retardance $\delta_m$ and a measurement angle $\theta_m$ determined from $m_k$, and wherein the instructions are executable to correct the birefringence values by determining a relative angle $\theta_r$ and a relative retardance $\delta_r$ given by:

$$\delta_r \sin 2\theta_r = \delta_m \sin 2\theta_m - \delta_b \sin 2\theta_b = U,$$

$$\delta_r \cos 2\theta_r = \delta_m \sin 2\theta_m - \delta_b \sin 2\theta_b = V, \text{ and}$$

$$\delta_r = \sqrt{U^2+V^2}, \text{ and } \theta_r = \frac{1}{2}\arctan\left(\frac{U}{V}\right).$$

In some such examples, the instructions are further executable to determine $\alpha$ by optimizing an error between a retardance of a known specimen and calculated retardance distributions. In some such examples, the instructions are executable to acquire the image of the voxel by acquiring an image of an array of voxels in an image plane, and wherein the one or more birefringent regions of the storage medium other than the voxel comprises one or more other voxels outside of the image plane. Another example provides a computer-readable storage device comprising instructions that are executable by a computing system to read birefringent data from a storage medium by receiving an image of a voxel of the storage medium, the image comprising higher frequency image information arising from a birefringence state of the voxel and lower frequency image information arising from one or more birefringent regions of the storage medium other than the voxel, applying a first low-pass filter with a first cutoff frequency to the image of the voxel to obtain a first background image, applying a second low-pass filter with a second cutoff frequency to the image of the voxel to obtain a second background image, the second cutoff frequency being different than the first cutoff frequency, determining an enhanced background image from the first background image and the second background image, determining birefringence values for the enhanced background image, determining birefringence values for the image of the voxel, and correcting the birefringence values for the image of the voxel based upon the birefringence values for the enhanced background image. In some such examples, the instructions executable to acquire the image of the voxel of the storage medium are executable to acquire a plurality of images of the voxel at different polarization states, and to apply the first low-pass filter and the second low-pass filter to each image of the plurality of images of the voxel. In some such examples, the instructions executable to determine the enhanced background image comprise instructions executable to combining the first background image and the second background image with a multiplicative constant. In some such examples, the enhanced background image for image $m_k$ of the voxel acquired at polarization state k is denoted as $b_k$ and wherein the instructions are executable to determine $b_k$ by:

$$b_k = \alpha(\text{LowPass}_1(m_k) - \text{LowPass}_2(m_k)) + \text{LowPass}_2(m_k)$$

wherein the first low-pass filter is $\text{LowPass}_1$, the second low-pass filter is $\text{LowPass}_2$ and $\alpha$ is the multiplicative constant. In some such examples, the birefringence values for the enhanced background image comprise a background retardance $\delta_b$ and a background angle $\theta_b$ determined from $b_k$, wherein the birefringence values for the image of the voxel comprises a measurement retardance $\delta_m$ and a measurement angle $\theta_m$ determined from $m_k$, and wherein the instructions are executable to correct the birefringence values by determining a relative angle $\theta_r$ and a relative retardance given by $$\delta_r \sin 2\theta_r = \delta_m \sin 2\theta_m - \delta_b \sin 2\theta_b = U,$$

$$\delta_r \cos 2\theta_r = \delta_m \sin 2\theta_m - \delta_b \sin 2\theta_b = V,$$

$$\delta_r = \sqrt{U^2+V^2}, \text{ and}$$

$$\theta_r = \frac{1}{2}\arctan\left(\frac{U}{V}\right).$$

In some such examples, the instructions are executable to acquire the image of the voxel by acquiring an image of an array of voxels in an image plane, and wherein the one or more birefringent regions of the storage medium other than the voxel comprises one or more other voxels outside of the image plane.

Another example provides, on a computing device, a method for reading data stored as birefringence values in a storage medium, the method comprising acquiring a measurement comprising an intensity $m_k$ image of a voxel of the storage medium using light of a polarization state k, determining a likelihood function for the image of the voxel, the likelihood function representing a likelihood, for each birefringence value set of a plurality of possible birefringence value sets, of an intensity of the voxel being produced by the birefringence value set, the likelihood function being based upon a selected data model and a selected noise model; determine a maximum value of the likelihood function, and determine a most likely set of birefringence values for the voxel based upon a birefringence value set that produce the maximum value of the likelihood function. In some such examples, the noise model comprises a Gaussian noise model. In some such examples, the likelihood of measuring an intensity $m_k$ of an image of a voxel for a measurement state k is given by:

$$P(m_k \mid I_k) = (2\pi\sigma^2)^{-\frac{1}{2}}\exp\left(-\frac{(I_k - m_k)^2}{2\sigma^2}\right),$$

where polarization state k comprises a swing $\chi_k$ and an angle $\theta_k$, where $I_k = a(1 - \cos\chi_k \cos\delta + \sin\chi_k \sin\delta \sin(2\phi - 2\theta)) + b$ and is an expected measurement taken for the polarization state k, where $\delta$ is a retardance of the voxel of the storage medium, where $\phi$ is an azimuth angle of the voxel of the storage medium, where a is a scale parameter, where b is an offset, and where $\sigma$ is a representation of noise.

In some such examples, the likelihood function, for a set of measurements $\{m_k\}_{k=1}^N$, is represented by L and is given by $L = \Pi_{k=1}^N P(m_k \mid I_k)$, and wherein the method comprises computing L for a plurality of values of each of a, b, $\delta$ and $\phi$, and determining the most likely set of birefringence values as $\{a, b, \delta, \phi\} = \text{argmax}(L(a, b, \delta, \phi))$.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method for reading data stored as birefringence values in a storage medium, the method comprising:

acquiring an image of a voxel of the storage medium, the image of the voxel comprising higher frequency image information arising from a birefringence state of the voxel and lower frequency image information arising from one or more birefringent regions of the storage medium other than the voxel;

applying a first low-pass filter with a first cutoff frequency to the image of the voxel to obtain a first background image;

applying a second low-pass filter with a second cutoff frequency to the image of the voxel to obtain a second background image, the second cutoff frequency being different than the first cutoff frequency;

determining an enhanced background image from the first background image and the second background image;

determining birefringence values for the enhanced background image;

determining birefringence values for the image of the voxel; and correcting the birefringence values for the image of the voxel based upon the birefringence values for the enhanced background image.

2. The method of claim 1, wherein acquiring the image of the voxel of the storage medium comprises acquiring a plurality of images of the voxel at different polarization states, and wherein applying the first low-pass filter and the second low-pass filter to the image of the voxel comprises applying the first low-pass filter and the second low-pass filter to each image of the plurality of images of the voxel.

3. The method of claim 1, wherein determining the enhanced background image comprises combining the first background image and the second background image with a multiplicative constant.

4. The method of claim 3, wherein the enhanced background image for image $m_k$ of the voxel acquired at polarization state k is denoted as $b_k$ and is determined by:

$$b_k = \alpha(\text{LowPass}_1(m_k) - \text{LowPass}_2(m_k)) + \text{LowPass}_2(m_k)$$

wherein the first low-pass filter is $\text{LowPass}_1$, the second low-pass filter is $\text{LowPass}_2$, and $\alpha$ is the multiplicative constant.

5. The method of claim 4, wherein the birefringence values for the enhanced background image comprises a background retardance $\delta_b$ and a background angle $\theta_b$ determined from $b_k$, wherein the birefringence values for the image of the voxel comprise a measurement retardance $\delta_m$ and a measurement angle $\theta_m$ determined from $m_k$, and wherein the method further comprises correcting the birefringence values by determining a relative angle $\theta_r$ and a relative retardance $\delta_r$ by $$\delta_r \sin 2\theta_r = \delta_m \sin 2\theta_m - \delta_b \sin 2\theta_b = U,$$

$$\delta_r \cos 2\theta_r = \delta_m \sin 2\theta_m - \delta_b \sin 2\theta_b = V,$$

$$\delta_r = \sqrt{U^2 + V^2}, \text{ and}$$

$$\theta_r = \frac{1}{2}\arctan\left(\frac{U}{V}\right).$$

6. The method of claim 4, further comprising determining a based upon optimizing an error between a retardance of a known specimen and calculated retardance distributions.

7. The method of claim 1, wherein acquiring the image of the voxel comprises acquiring an image of an array of voxels in an image plane, and wherein the one or more birefringent regions of the storage medium other than the voxel comprises one or more other voxels outside of the image plane.

8. A computer system, comprising:
a logic subsystem; and
a storage subsystem comprising instructions executable by the logic subsystem to read birefringent data from a storage medium by
receiving an image of a voxel of the storage medium, the image comprising higher frequency image information arising from a birefringence state of the voxel and lower frequency image information arising from one or more birefringent regions of the storage medium other than the voxel;
applying a first low-pass filter with a first cutoff frequency to the image of the voxel to obtain a first background image;
applying a second low-pass filter with a second cutoff frequency to the image of the voxel to obtain a second background image, the second cutoff frequency being different than the first cutoff frequency;
determining an enhanced background image from the first background image and the second background image;
determining birefringence values for the enhanced background image;
determining birefringence values for the image of the voxel; and
correcting the birefringence values for the image of the voxel based upon the birefringence values for the enhanced background image.

9. The computer system of claim 8, wherein the instructions executable to acquire the image of the voxel of the storage medium are executable to acquire a plurality of images of the voxel at different polarization states, and to apply the first low-pass filter and the second low-pass filter to each image of the plurality of images of the voxel.

10. The computer system of claim 8, wherein the instructions executable to determine the enhanced background image comprise instructions executable to combining the first background image and the second background image with a multiplicative constant.

11. The computer system of claim 10, wherein the enhanced background image for image $m_k$ of the voxel acquired at polarization state k is denoted as $b_k$ and wherein the instructions are executable to determine $b_k$ by:

$$b_k = \alpha(\text{LowPass}_1(m_k) - \text{LowPass}_2(m_k)) + \text{LowPass}_2(m_k)$$

wherein the first low-pass filter is LowPass$_1$, the second low-pass filter is LowPass$_2$, and $\alpha$ is the multiplicative constant.

12. The computer system of claim 11, wherein the birefringence values for the enhanced background image comprises a background retardance $\delta_b$ and a background angle $\theta_b$ determined from $b_k$, wherein the birefringence values for the image of the voxel comprises a measurement retardance $\delta_m$ and a measurement angle $\theta_m$ determined from $m_k$, and wherein the instructions are executable to correct the birefringence values by determining a relative angle $\theta_r$ and a relative retardance $\delta_r$ given by:

$$\delta_r \sin 2\theta_r = \delta_m \sin 2\theta_m - \theta_b \sin 2\theta_b = U,$$

$$\delta_r \cos 2\theta_r = \delta_m \sin 2\theta_m - \delta_b \sin 2\theta_b = V,$$

$$\delta_r = \sqrt{U^2 + V^2}, \text{ and}$$

$$\theta_r = \frac{1}{2}\arctan\left(\frac{U}{V}\right).$$

13. The computer system of claim 11, wherein the instructions are further executable to determine $\alpha$ by optimizing an error between a retardance of a known specimen and calculated retardance distributions.

14. The computer system of claim 8, wherein the instructions are executable to acquire the image of the voxel by acquiring an image of an array of voxels in an image plane, and wherein the one or more birefringent regions of the storage medium other than the voxel comprises one or more other voxels outside of the image plane.

15. A computer-readable storage device comprising instructions that are executable by a computing system to read birefringent data from a storage medium by
receiving an image of a voxel of the storage medium, the image comprising higher frequency image information arising from a birefringence state of the voxel and lower frequency image information arising from one or more birefringent regions of the storage medium other than the voxel;
applying a first low-pass filter with a first cutoff frequency to the image of the voxel to obtain a first background image;
applying a second low-pass filter with a second cutoff frequency to the image of the voxel to obtain a second background image, the second cutoff frequency being different than the first cutoff frequency;
determining an enhanced background image from the first background image and the second background image;
determining birefringence values for the enhanced background image;
determining birefringence values for the image of the voxel; and
correcting the birefringence values for the image of the voxel based upon the birefringence values for the enhanced background image.

16. The storage device of claim 15, wherein the instructions executable to acquire the image of the voxel of the storage medium are executable to acquire a plurality of images of the voxel at different polarization states, and to apply the first low-pass filter and the second low-pass filter to each image of the plurality of images of the voxel.

17. The storage device of claim 15, wherein the instructions executable to determine the enhanced background image comprise instructions executable to combining the first background image and the second background image with a multiplicative constant.

18. The storage device of claim 17, wherein the enhanced background image for image $m_k$ of the voxel acquired at polarization state k is denoted as $b_k$ and wherein the instructions are executable to determine $b_k$ by:

$$b_k = \alpha(\text{LowPass}_1(m_k) - \text{LowPass}_2(m_k)) + \text{LowPass}_2(m_k)$$

wherein the first low-pass filter is $\text{LowPass}_1$, the second low-pass filter is $\text{LowPass}_2$, and $\alpha$ is the multiplicative constant.

19. The storage device of claim 17, wherein the birefringence values for the enhanced background image comprises a background retardance $\delta_b$ and a background angle $\theta_b$ determined from $b_k$, wherein the birefringence values for the image of the voxel comprises a measurement retardance $\delta_m$ and a measurement angle $\theta_m$ determined from $m_k$, and wherein the instructions are executable to correct the birefringence values by determining a relative angle $\theta_r$ and a relative retardance given by:

$$\delta_r \sin 2\theta_r = \delta_m \sin 2\theta_m - \delta_b \sin 2\theta_b = U,$$

$$\delta_r \cos 2\theta_r = \delta_m \sin 2\theta_m - \delta_b \sin 2\theta_b = V,$$

$$\delta_r = \sqrt{U^2 + V^2}, \text{ and}$$

$$\theta_r = \frac{1}{2}\arctan\left(\frac{U}{V}\right).$$

20. The storage device of claim 15, wherein the instructions are executable to acquire the image of the voxel by acquiring an image of an array of voxels in an image plane, and wherein the one or more birefringent regions of the storage medium other than the voxel comprises one or more other voxels outside of the image plane.

* * * * *